United States Patent
Banerjee et al.

(10) Patent No.: US 8,295,548 B2
(45) Date of Patent: Oct. 23, 2012

(54) SYSTEMS AND METHODS FOR REMOTE TAGGING AND TRACKING OF OBJECTS USING HYPERSPECTRAL VIDEO SENSORS

(75) Inventors: Amit Banerjee, Burtonsville, MD (US); Phillippe M. Burlina, Rockville N. Bethesda, MD (US); Joshua B. Broadwater, Catonsville, MD (US)

(73) Assignee: The Johns Hopkins University, Baltimore, MD (US)

( * ) Notice: Subject to any disclaimer, the term of this patent is extended or adjusted under 35 U.S.C. 154(b) by 372 days.

(21) Appl. No.: 12/818,215

(22) Filed: Jun. 18, 2010

(65) Prior Publication Data

US 2010/0322480 A1    Dec. 23, 2010

Related U.S. Application Data

(60) Provisional application No. 61/269,317, filed on Jun. 22, 2009.

(51) Int. Cl.
G06K 9/00 (2006.01)
G01C 3/08 (2006.01)

(52) U.S. Cl. .................. 382/103; 382/291; 356/3.12

(58) Field of Classification Search ............ 382/100, 382/103–107, 155, 162, 168, 173, 181, 199, 382/203, 224, 232, 254, 274, 276, 281–291, 382/305, 312; 356/330, 300, 3.12; 244/3.14; 702/62
See application file for complete search history.

(56) References Cited

U.S. PATENT DOCUMENTS

| 6,859,275 | B2* | 2/2005 | Fateley et al. ............ 356/330 |
| 7,106,435 | B2* | 9/2006 | Nelson ..................... 356/300 |
| 7,324,196 | B2 | 1/2008 | Goldstein et al. |
| 7,534,984 | B2 | 5/2009 | Gleckler |
| 7,537,181 | B2* | 5/2009 | Owens et al. ............ 244/3.14 |
| 7,538,872 | B1 | 5/2009 | Butler et al. |
| 7,617,057 | B2* | 11/2009 | May et al. .................. 702/62 |
| 7,620,218 | B2 | 11/2009 | Steinberg et al. |
| 8,073,254 | B2* | 12/2011 | Saptharishi et al. ......... 382/173 |
| 2004/0236229 | A1 | 11/2004 | Freeman et al. |
| 2005/0002572 | A1 | 1/2005 | Saptharishi et al. |
| 2006/0218057 | A1 | 9/2006 | Fitzpatrick et al. |
| 2008/0291278 | A1 | 11/2008 | Zang et al. |
| 2009/0102705 | A1 | 4/2009 | Obermeyer |
| 2009/0118622 | A1 | 5/2009 | Durkin et al. |
| 2009/0214084 | A1 | 8/2009 | Asner |
| 2009/0295910 | A1 | 12/2009 | Mir et al. |
| 2009/0303055 | A1 | 12/2009 | Anderson et al. |
| 2010/0028859 | A1 | 2/2010 | Moshe et al. |
| 2010/0033574 | A1 | 2/2010 | Ran et al. |

FOREIGN PATENT DOCUMENTS

| WO | WO2007035597 | 3/2007 |
| WO | WO2008093988 | 8/2008 |
| WO | WO2010003220 | 1/2010 |

* cited by examiner

*Primary Examiner* — Seyed Azarian

(74) *Attorney, Agent, or Firm* — Aisha Ahmad

(57) ABSTRACT

Detection and tracking of an object by exploiting its unique reflectance signature. This is done by examining every image pixel and computing how closely that pixel's spectrum matches a known object spectral signature. The measured radiance spectra of the object can be used to estimate its intrinsic reflectance properties that are invariant to a wide range of illumination effects. This is achieved by incorporating radiative transfer theory to compute the mapping between the observed radiance spectra to the object's reflectance spectra. The consistency of the reflectance spectra allows for object tracking through spatial and temporal gaps in coverage. Tracking an object then uses a prediction process followed by a correction process.

20 Claims, 6 Drawing Sheets

SYSTEMS AND METHODS FOR REMOTE TAGGING AND TRACKING OF OBJECTS USING HYPERSPECTRAL VIDEO SENSORS

CROSS REFERENCE TO RELATED APPLICATION

This application claims the benefit of U.S. Provisional Application No. 61/269,317, filed on Jun. 22, 2009 which is incorporated herein by reference in its entirety.

BACKGROUND OF THE INVENTION

1. Field of the Invention

The invention described herein relates to imaging and object tracking.

2. Background Art

Acquiring and tracking a moving object can be aided by automated processing to improve speed and accuracy. Such processing may include technology that includes computer vision. Computer vision algorithms generally exploit shape and/or appearance features for automated analysis of images and video.

Appearance-based methods are challenged by the changes in an object's appearance. The changes may be due to several factors. These may include a) different illumination sources and conditions, b) variations of the object's orientation with respect to the illumination source and camera, and c) different reflectance properties of objects in the scene. Such variability compromises the performance of many vision systems, including background subtraction methods for motion detection, appearance-based trackers, face recognition algorithms, and change detection.

What are needed, therefore, are systems and methods that provide for the acquisition and tracking of an object where the tracking can be maintained even if changes occur in the illumination sources, object orientation, and appearances of other objects in a scene, or if tracking is momentarily lost.

BRIEF SUMMARY OF THE INVENTION

Identification of an object may be based on its spectral fingerprint. This fingerprint is the object's unique spectral signature based on its molecular composition. This allows two seemingly similar objects to be uniquely distinguished from each other in the presence of other objects. The spectral fingerprint can be either the intrinsic reflectance of an object or the emissivity of an object based on the wavelengths being recorded. Reflectance occurs in the visible, near-infrared, and short wave infrared part of the electromagnetic spectrum and is the ratio of the amount of light striking an object to the amount of light being reflected from an object. Emissivity is a measure of the amount of energy emitted from an object compared to a uniform emitter. By identifying the reflectance or emissivity of an object, a unique spectral fingerprint can be used for surveillance of an object. As will be described in greater detail below, reflectance spectra can be used to perform detection, tracking and association, which are necessary steps for object surveillance.

The detection of an object can exploit its spectral fingerprint by leveraging its unique reflectance signature. Detecting objects in images is often difficult when objects in the scene have similar appearance (e.g., shape and intensity). However if this object's specific spectral signature is known, it can then be unambiguously detected and discriminated from the surrounding objects and background. This is done by examining every image pixel and computing how closely that pixel's spectrum matches a known object spectral signature. Alternatively, if the surrounding background spectral signature is known, it can be used for detecting new and unusual objects.

Tracking an object from one image to another image requires finding the corresponding locations of an object in both images. Stated differently, after various objects have been detected in both images, one needs to find a single match between each object in one image and the next image, a process called association. Association is often difficult when there are many objects in a scene, when objects look similar, or when many of these objects appear and/or disappear from the scene. This problem can be addressed by using spectral information: by looking at the fine spectral signature of each object detected in the first image, this signature can be used to find the closest match in the set of objects detected in the next image. When association is done, physical models can be used to refine each object's spectral signature. This refined spectral signature is then used again for doing future associations.

The use of reflectance spectra for detection, tracking and association of objects allows for the following new capabilities:

Illumination-invariant Tracking

The reflectance spectrum of an object is independent of the illumination and atmospheric conditions under which it is observed. Hence, with the ability to estimate the reflectance spectrum under a wide range of viewing conditions, illumination-invariant tracking can be achieved by using the reflectance spectrum to detect, track, and associate the object across multiple images.

Track Through Gaps in Coverage

Since the reflectance spectrum of an object is consistent over time and independent of illumination conditions, spectral matching algorithms can be used to track and associate the object across spatial and temporal gaps in coverage. For example, if the object leaves the field of view (FOV) of the sensor and re-appears in minutes/hours/days, spectral matching algorithms can be used to determine where and when it has re-appeared in the sensor's FOV.

Tracking in the Presence of Confusers

The performance of many existing tracking algorithms suffers when there are multiple objects with similar appearance/color in the sensor's FOV. The invention described herein addresses this problem by exploiting high-resolution reflectance spectra, which often provides a unique signature/fingerprint that can distinguish the tracked object from others with the same color. For example, when tracking a single white object of interest in a crowd of white objects, the reflectance spectrum of the object of interest can be used to discriminate it from the other white objects, and thus reduce the false alarms that often confuse existing surveillance systems.

A hyperspectral video surveillance system is described herein, which uses a hyperspectral video (HSV) camera. This sensor captures hyperspectral imagery at near-video rates. While standard video cameras capture only three wide-bandwidth color images, the HSV camera collects many narrow-bandwidth images of the scene. For many vision systems, an HSV camera provides several advantages. An HSV camera provides high spatial and temporal resolution to detect and track moving objects. The high spectral resolution allows distinction between objects with similar color. An HSV camera also provides the ability to incorporate radiative transfer theory models to mitigate the effects of illumination variations. Moreover, since a hyperspectral video camera is able to simultaneously capture images with high temporal, spatial, and spectral resolution, it combines the advantages of both video and hyperspectral imagery. HSV cameras are commercially available from vendors such as Surface Optics Corporation of San Diego, Calif.

An HSV camera allows for illumination-invariant vision algorithms for a wide range of problems. Specifically, the measured radiance spectra of the object can be used to estimate its intrinsic reflectance properties that are invariant to a wide range of illumination effects. This is achieved by incorporating radiative transfer theory to compute the mapping between the observed radiance spectra to the object's reflectance spectra.

BRIEF DESCRIPTION OF THE DRAWINGS/FIGURES

Further embodiments, features, and advantages of the present invention, as well as the operation of the various embodiments of the present invention, are described below with reference to the accompanying drawings.

DETAILED DESCRIPTION OF THE INVENTION

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

Figure 1:
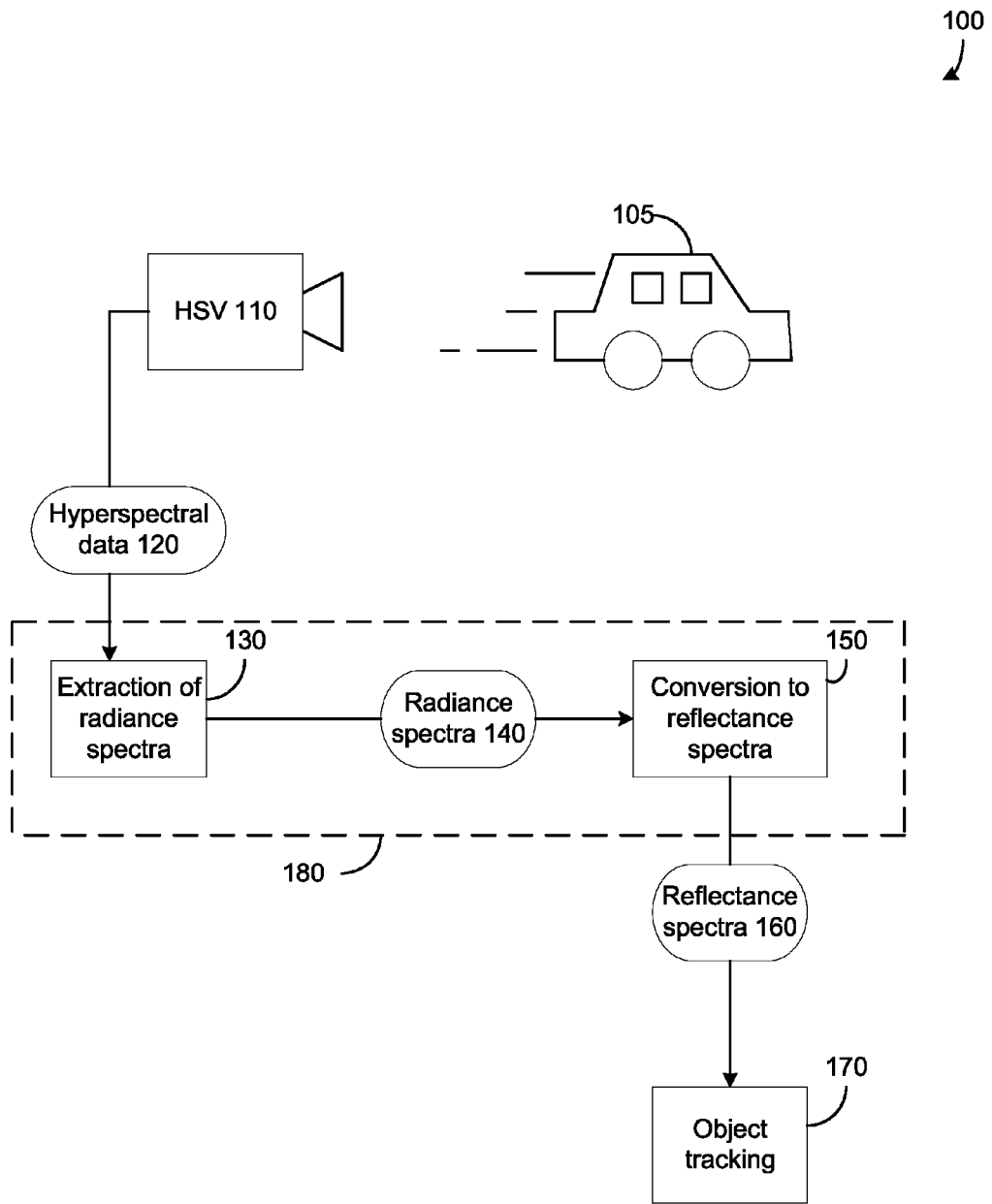
FIG. 1 is a block diagram illustrating the overall structure of an embodiment of the invention.

FIG. 1 illustrates the overall system of the invention, according to an embodiment. An object 105 is shown being imaged by a hyperspectral video (HSV) camera 110. Most modern video cameras provide imagery with high spatial and temporal resolution. This can be somewhat useful for detecting and tracking moving objects. However, their low spectral resolution limits their ability to classify or identify objects based on color alone. Conversely, traditional hyperspectral sensors offer high-resolution spectral and spatial imagery at low temporal resolutions with modest frame rates (up to 0.5 Hz). Hence, they have been utilized extensively for object detection and classification, but only in static, non-dynamic environments, such as geological imaging.

HSV cameras are now available, which are able to capture hyperspectral datacubes at near video rates. The HSV camera offers high spatial, temporal, and spectral resolution imagery. The HSV camera combines the benefits of video and hyperspectral data to allow simultaneously detecting, tracking, and identifying objects using computer vision and hyperspectral image analysis methods.

In an embodiment, the HSV camera is a passive sensor that measures the optical spectra of every pixel from 400-1000 nm (visible and near-IR wavelengths). It acquires datacubes using a line scanning technique. An oscillating mirror scans the scene up to ten times a second, and for each mirror position one horizontal scan line is acquired and its pixels are decomposed by a spectrometer into a full spectral plane. The spectral plane is captured by a charge coupled device (CCD), and is built into a datacube as the mirror completes a vertical scan of the scene. The acquired cube is then either immediately processed in real time or stored, e.g., on a hard drive. Acquisition conditions may be controlled by an operator through an on-board computer. Integration time can also be modified to accommodate low light conditions.

Referring again to FIG. 1, hyperspectral data 120 is output from HSV 110 in the illustrated embodiment. At 130, the hyperspectral data 120 is processed to extract the radiance spectra. This is shown as radiance spectra 140. Note that in an embodiment of the invention, the radiance spectra may have been captured independently of the other data captured by the HSV camera, i.e., spatial and temporal data. In this case, a distinct extraction process for the radiance spectra may not be necessary. At 150, the radiance spectra 140 is converted to reflectance spectra 160. The reflectance spectra 160 is then used in a tracking process 170. Processes 150 and 170 are described in greater detail below.

In an embodiment, processes 130 and 150 may be implemented in a single module 180. Module 180 may be implemented in software, firmware, hardware, or some combination thereof. Software/firmware implementations may use assembly language or any higher order language, as would be known to a person of ordinary skill in the art. Hardware embodiments may be implemented using application specific integrated circuitry, field programmable gate arrays (FPGA), or any other hardware technology know in the art. In an alternative embodiment (not shown), the tracking process 170 may also be implemented by module 180.

Figure 2:
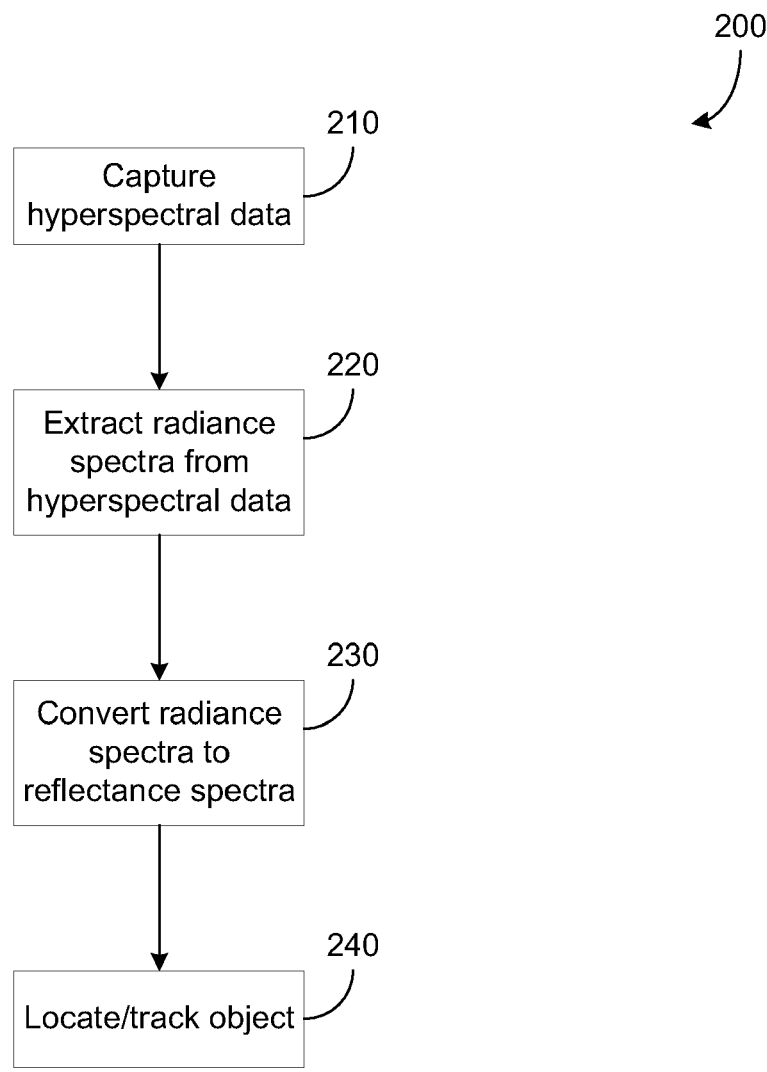
FIG. 2 is a flowchart illustrating the processing of an embodiment of the invention.

The overall processing of the invention is shown in FIG. 2, according to an embodiment. At 210, hyperspectral data is captured. As discussed above, this data may be captured by an HSV camera in an embodiment of the invention. At 220, radiance spectra is extracted from the hyperspectral data, as necessary.

At 230, the radiance spectra is converted to reflectance spectra. In an embodiment of the invention, the reflectance spectra is obtained from the radiance by using a physics modeling system taking into account environmental, weather and atmospheric conditions. One embodiment of this modeling system is MODTRAN.

Generally, in the reflectance domain, there are six main sources of light. The most obvious source is the sun. Light is generated at the sun, passes through the atmosphere, reflects off of the object being imaged, and eventually reaches the sensor. Along the way, the spectral properties of the light are changed as photons are absorbed and scattered through the atmosphere.

Skylight takes a very similar path to sunlight. Once the light reaches the object being imaged, it reflects the same as the sunlight (assuming a diffuse material), and is reflected back through the atmosphere to the sensor along the same path as the sun light. The difference however is that skylight is generated by light scattered in the atmosphere from all directions.

The remaining four sources of light (upwelled radiance, multipath effects, adjacency effects, and trapping effects) are typically orders of magnitude less energetic than sunlight or skylight. Because of this fact, these effects can largely be ignored for short-range, ground-based imaging. However, sometimes multipath and adjacency effects can become noticeable given the unique geometries of ground-based sensing. For example, light reflected from vegetation surrounding an object being imaged can impart part of the vegetative reflectance signature to the object—especially when the object is in full shade conditions where limited skylight is able to reach the object (e.g. dark shadows).

As would be understood by a person of ordinary skill in the art, the full radiometric equation is a sum of the six different sources of light. In an embodiment, the radiometric transfer function can be suitably expressed by using the three most significant terms. The radiometric transfer function for this can therefore be expressed as $$L(x,y,\lambda)=R(x,y,\lambda)\{A(\lambda)+F(x,y)B(\lambda)\}$$

where $A(\lambda)$ represents the radiance due to sunlight, $F(x,y)$ represents the amount of sky light at pixel $(x,y)$ (i.e., in shadow zones the amount of sky not blocked by the object creating the shadow), $R(x,y,\lambda)$ is the reflectance of the object being imaged, and $B(\lambda)$ represents the radiance due to sky light. This assumes that the scene is small enough that the source-object-receiver geometry is similar across the image. Also, the terms $A(\lambda)$ and $B(\lambda)$ are considered to be independent of pixel location when small areas are imaged (i.e., the sunlight and skylight terms do not vary over the small area being imaged).

Using the radiometric theory described, one can approximate the underlying reflectance signatures in an image. To do this, the image must contain an object with a known reflectance signature. One approach is to identify objects in the scene that have nearly flat reflectance signatures (i.e. constant and independent of wavelength) in full sunlight conditions. Examples of common materials with flat reflectance include concrete and asphalt. The above equation then becomes $$L_{flat}(\lambda)=k\{A(\lambda)+FB(\lambda)\}$$

where k now represents an unknown flat reflectance value independent of wavelength. One may also note that the location $(x,y)$ has been removed as there is a need only to identify the flat reflectance object in the scene, not its location. If the entire image is in sunlight, then the reflectance of the image can be calculated as $$R(x, y, \lambda) = k\frac{L(x, y, \lambda)}{L_{flat}(\lambda)}$$

to within some unknown offset k. To remove the effects of k, each pixel is normalized to have the same energy. The result is an image with fewer illumination differences.

For images that contain shadow zones, the process is slightly more complicated. First, a shadow mask must be estimated. The energy of each pixel, computed using either the $L_1$ or $L_2$ norm of its spectra, is thresholded to produce the shadow mask. In this process, very dark objects will be considered in shadow zones independent of their true illumination condition, but the process produces good results in an efficient manner.

Once a shadow mask has been created, a shadow line must be found that crosses across the same material. For the pixels in the full sunlight condition, the previous equation is applied to estimate the reflectance. Using the estimated reflectance, the skylight effects can be estimated such that $$kF(x, y)B(\lambda) = \frac{L(x, y, \lambda)}{R(x, y, \lambda)}$$

for pixels of the same material just inside the shadow zone. Now estimates for both full sun and full shade conditions are available.

Using these estimates and the shadow mask, pixels in full sun can be converted to reflectance. For pixels in shade, their reflectance can be calculated using $$R(x, y, \lambda) = \frac{L(x, y, \lambda)}{kF(x, y)B(\lambda)}$$

Again, the offsets due to k or $F(x,y)$ are not known, but this can be handled by normalizing the resulting reflectance as was done above.

Figure 3:
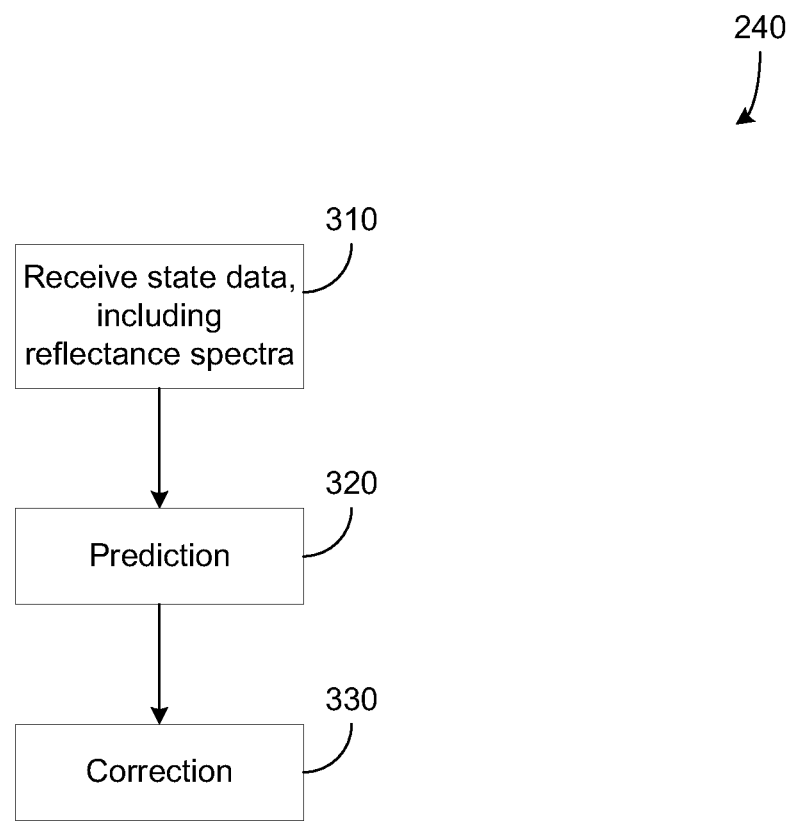
FIG. 3 is a flowchart illustrating the tracking process, according to an embodiment of the invention.

At 240, the resulting reflectance spectra may be used for locating or tracking an object. This process is illustrated in greater detail in FIG. 3. At 310, state data for a current frame or image is received, where the state data includes the reflectance spectra of the object. In an embodiment, the state data may be organized as a formatted state description.

In an embodiment, the state description may take the form of a state vector for example, of the form $$X_i=[\text{refl\_spectrum}, H, W, x, y, \dot{x}, \dot{y}]^T,$$

where i denotes the frame, H and W specify the height and width of the bounding box containing the object in the image, x, y are the horizontal and vertical position of the center of the object's bounding box in the image, $\dot{x},\dot{y}$ are the horizontal and vertical velocities of the object's bounding box in the image, and T denotes transposition. Note that while the example above uses a rectangular bounding box, in general any bounding shape or area (and a specification thereof) may be used.

Embodiments of a state description may include one or more of the following: a spectral vector, spatial descriptors, shape descriptors, spatio-temporal descriptors, temporal descriptors, or kinematic descriptors. Examples of shape descriptors include parametric descriptors such as moment descriptors, Fourier shape descriptors, active contours, active volumes, snakes, dynamic curves, and any combination of these. Kinematic descriptors may include position, velocity, acceleration and any higher order derivative. Appearance descriptors may include feature vectors that are derived from the spectral vectors by using methods such as dimensionality reduction or reprojection or filtering of the spectra. Such methods include PCA, LDA, projection pursuit, wavelet descriptors, and any related method.

Tracking an object includes a prediction process 320 followed by a correction process 330, as shown in the illustrated embodiment. Given the reflectance spectra from the HSV camera, various processes can be used to track objects in challenging scenarios. Tracking may be based on frame-to-frame matching so as to minimize the need to exploit the kinematics of the object across frames. Since the reflectance spectra are invariant to the imaging conditions, the objects can be tracked by comparing the spectra of every pixel with the spectra of the tracked object. The additional spectral features observed by the HSV camera allow a tracking process to discern between objects of similar colors that would have otherwise not have been separated by a traditional red/green/blue (RGB) camera.

The detection problem may be posed as a one-class hypothesis test in an embodiment. A parametric model for the reflectance spectra of the tracked object may be adopted. Pixels in the HSV sequence that are well-matched to the model are considered to be the tracked object. In an embodiment, a Gaussian model may be assumed for the spectra, which allows use of the Mahalanobis distance classifier.

Specifically, the mean vector m and the covariance matrix Σ of the object's reflectance spectra are estimated to form the Gaussian model N(m, Σ). In each successive HSV frame, the Mahalanobis distance test $$m_M(x)=(x-m)\Sigma^{-1}(x-m)\leq T$$

is computed for every pixel x. The threshold T can be determined by using a constant false alarm rate argument. Pixels whose Mahalanobis distance is below T are considered to be the tracked object. Note that since the process operates on each pixel independently, it can be implemented in parallel for real-time operation in an embodiment. As would be understood by a person of ordinary skill in the art, alternatives to the use of the Mahalanobis distance test and a Gaussian model are available and may be used instead. Rather, the Mahalanobis test and Gaussian model are presented here as examples, and are not meant to limit the scope of the invention.

The prediction process 320 may be performed using a tracking process. A tracking process may include the use of one or more of a Bayes filter, an observer-predictor filter, an alpha-beta filter, a Kalman filter, an extended Kalman filter, an Unscented Kalman filter, an iterated extended Kalman filter, a particle filter, a condensation filter, and any related filter. One embodiment of the particle filter tracker can use importance sampling, sequential importance sampling, factored sampling, or any related sampling.

Figure 4:
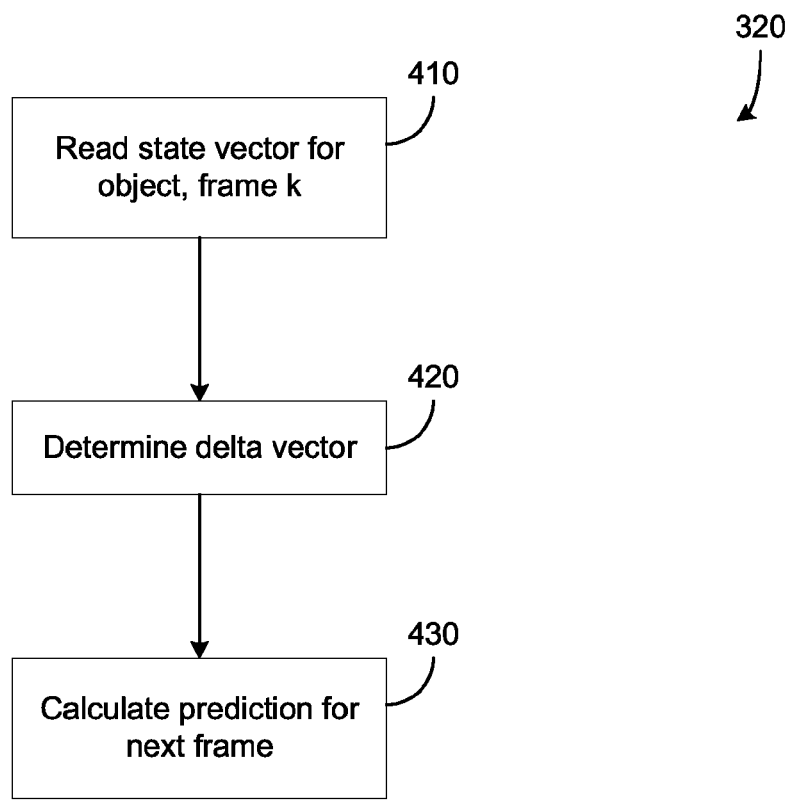
FIG. 4 is a flowchart illustrating the prediction process, according to an embodiment of the invention.

One embodiment of a prediction process is illustrated in FIG. 4, according to an embodiment. At 410, the state vector for the current frame is read. In an embodiment the state vector may have the form $X_i=[\text{refl\_spectrum}, H, W, x, \dot{y}, \dot{x}]^T$, as noted above. The prediction step uses the velocity and other dynamic model parameters to predict the value of the state vector at frame k from $X_{k-1}$. To do this, a delta description is determined, as shown at 420. In the illustrated embodiment, the delta description may take the form of a vector. This delta vector may be combined at 430 with the state vector of a preceding frame k−1, shown here as $X_{k-1}$. The predicted state may therefore be expressed as the vector $\hat{X}_k=X_{k-1}+[0, \Delta H, \Delta W, \dot{x}, \dot{y}, \ddot{x}, \ddot{y}]^T+n$, where 0 is the zero vector (since the reflectance spectrum is constant for the tracked object), ΔH, ΔW are the expected changes in the height and width of the object, and $\ddot{x},\ddot{y}$ are the horizontal and vertical image accelerations of the tracked object. The vector n is a random Gaussian noise vector that represents uncertainty in the dynamic model.

Figure 5:
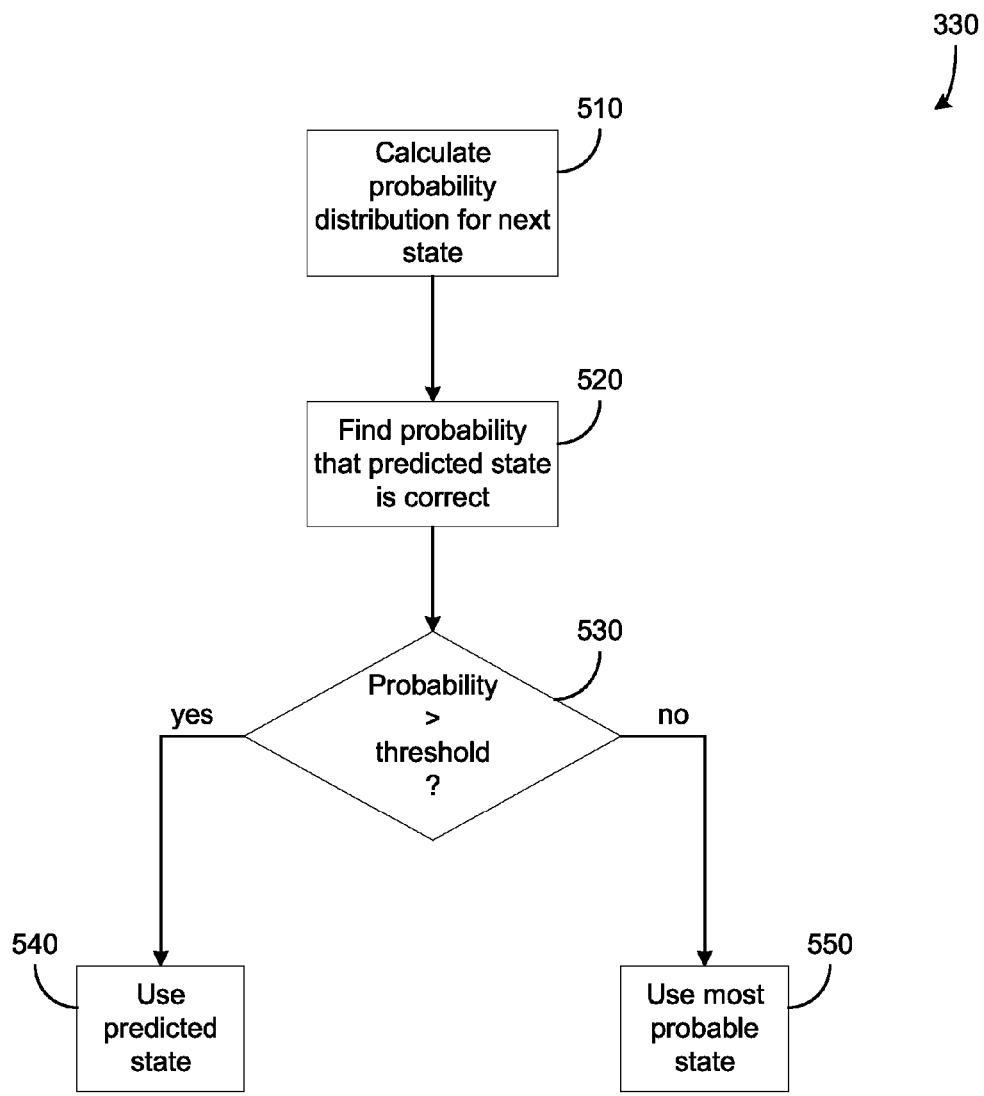
FIG. 5 is a flowchart illustrating the correction process, according to an embodiment of the invention.

The correction process is shown in FIG. 5, according to an embodiment. At 510, a probability distribution for the next state is calculated. Probabilisitic modeling can be embodied by using a parametric or non-parametric distribution. Embodiments of a non-parametric distribution use a Parzen window PDF estimator, a mixture of Gaussian estimators, mixtures of arbitrary kernels, a support vector PDF estimator, or any related estimator. Embodiments of parametric distribution modeling may use uniform, Gaussian, Cauchy, gamma, beta, exponential, symmetric alpha stable, K, Weibull, Ricean, log normal, Pearson, or Polya modeling, or any variations and/or combinations of the above.

In the illustrated embodiment, the correction process uses a measurement function and the new observation (the hyperspectral video image) to update probabilities of the state vector $X_k$ for frame k. In an embodiment, the likelihood or probability of the state vector is given by $$p(X_k|Z_{1:k})\propto\exp\{-(x-y)^T\Sigma^{-1}(x-y)\},$$

Where in this context x is the average reflectance spectrum of the tracked object, y is the average reflectance spectrum in the part of the image specified by the bounding box $X_k$, and Σ is the spectral covariance matrix of the tracked object.

At 520, a determination is made for the probability that the predicted state is correct. At 530, a decision is made as to whether this probability exceeds a predetermined threshold. If so, then at 540 the predicted state is used. Otherwise, at 550 the most likely state is used, as determined by the probability distribution. An optimal estimate for the state vector $X_k$ is the one that has the maximum probability or likelihood value.

The processing described above for the conversion of radiance to reflectance spectra, prediction, and correction may be implemented using digital logic in the form of software, firmware, or hardware, or some combination thereof. A hardware implementation may take the form of one or more field programmable gate arrays (FPGAs) for example. Alternatively, a hardware implementation may take the form of one or more application specific integrated circuits (ASICs) or other forms of hardware logic, as would be understood by a person of ordinary skill in the art.

Figure 6:
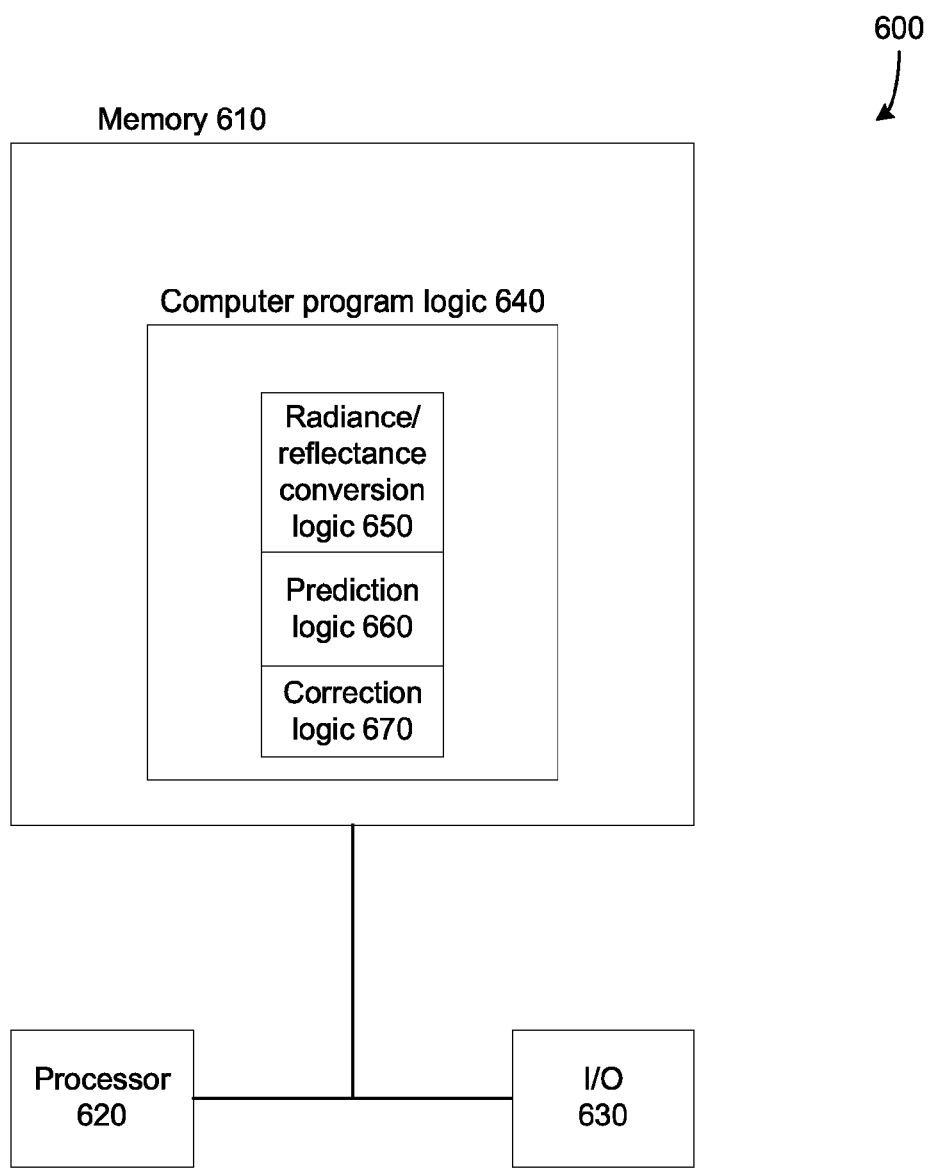
FIG. 6 is a block diagram illustrating a software or firmware embodiment of the invention.

The term software, as used herein, refers to a computer program product including a computer readable medium having computer program logic stored therein to cause a computer system to perform one or more features and/or combinations of features disclosed herein. A software embodiment is illustrated in the context of a computing system 600 in FIG. 6. System 600 may include a processor 620 and a body of memory 610 that may include one or more computer readable media that may store computer program logic 640. Memory 610 may be implemented as random access memory (RAM), read-only memory (ROM), or some combination thereof, for example. Processor 620 and memory 610 may be in communication using any of several technologies known to one of ordinary skill in the art, such as a bus. Computer program logic 640 is contained in memory 610 and may be read and executed by processor 620. One or more I/O ports and/or I/O devices, shown collectively as I/O 930, may also be connected to processor 920 and memory 610. Computing system may be incorporated in one or both of a transmission node or a receive node.

In the illustrated embodiment, computer program logic 640 includes radiance/reflectance conversion logic 650. The process for conversion of radiance spectra to reflectance spectra includes receiving radiance spectrum from an HSV camera and transforming the radiance spectrum to reflectance spectra in the manner described above. Computer program logic 640 may also include prediction logic 660. Prediction logic 660 may be responsible for predicting the location of an object in a succeeding frame, based on observation and parameters derived from a current frame, as described above. Computer program logic 640 may also include correction logic 670. This latter module may be responsible for determining and applying a correction to a predicted location of the object, as described above.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed:

1. A method of tracking an object, comprising:
   receiving radiance spectra of the object;
   converting the radiance spectra to reflectance spectra of the object;
   constructing a state description for the object comprising the reflectance spectra, a specification of a bounding area containing the object, and a location and velocity of the object in a current frame;
   predicting the location of the object in a next frame, based on the constructed state description and a delta description that comprises indications of predicted changes in the location and velocity, and based on invariance of the reflectance spectra of the object; and
   correcting the location of the object for the next frame,
   wherein the reflectance spectra of the object is received from a hyperspectral video camera.

2. The method of claim 1, wherein the radiance spectra comprises radiance hyperspectra.

3. The method of claim 1, wherein the reflectance spectra comprises reflectance hyperspectra.

4. The method of claim 1, wherein the radiance spectra of the object is received from a hyperspectral video camera.

5. The method of claim 1, wherein said predicting of the location of the object for
   the next frame comprises:
   predicting a next state description.

6. The method of claim 5, wherein said correcting of the location of the object comprises:
   calculating a probability distribution for the next state description, wherein the probability distribution is dependent on reflectance spectra derived for the object in the next frame;
   finding a probability that the predicted next state description is correct;
   if the probability exceeds a threshold value, using the predicted next state description to determine the location of the object in the next frame; and
   otherwise using a next state description having the highest probability in the probability distribution to determine the location of the object in the next frame.

7. The method of claim 6, wherein the probability that the predicted next state description is correct is given by
$p(X_k|Z_{1:k}) \propto \exp\{-(x-y)^T \Sigma^{-1}(x-y)\}$,
where
   x is the average reflectance spectrum of the object, y is the average reflectance spectrum in the bounding area $X_k$, and $\Sigma$ is the spectral covariance matrix of the object.

8. A system for tracking an object, comprising:
   a processor; and
   a memory in communication with said processor, said memory for storing a plurality of processing instructions for directing said processor to:
   receive radiance spectra of the object;
   convert the radiance spectra to reflectance spectra of the object;
   construct a state description for the object comprising the reflectance spectra, a specification of a bounding area containing the object, and a location and velocity of the object in a current frame;
   predict the location of the object in a next frame, based on the constructed state description and a delta description that comprises indications of predicted changes in the location and velocity, and based on invariance of the reflectance spectra of the object; and
   correct the location of the object for the next frame,
   wherein the reflectance spectra of the object is received from a hyperspectral video camera.

9. The system of claim 8, wherein the radiance spectra comprises radiance hyperspectra.

10. The system of claim 8, wherein the reflectance spectra comprises reflectance hyperspectra.

11. The system of claim 8, wherein the radiance spectra of the object is received from a hyperspectral video camera.

12. The system of claim 8, wherein said plurality of processing instructions for directing said processor to predict the location of the object for the next frame comprises processing instructions for directing said processor to:
   predict a next state description.

13. The system of claim 12, wherein said plurality of processing instructions for directing said processor to correct the location of the object comprises processing instructions for directing said processor to:
   calculate a probability distribution for the next state description, wherein the probability distribution is dependent on reflectance spectra derived for the object in the next frame;
   find a probability that the predicted next state description is correct;
   if the probability exceeds a threshold value, use the predicted next state description to determine the location of the object in the next frame; and
   otherwise use a next state description having the highest probability in the probability distribution to determine the location of the object in the next frame.

14. The system of claim 13, wherein the probability that the predicted next state description is correct is given by
$p(X_k|Z_{1:k}) \propto \exp\{-(x-y)^T \Sigma^{-1}(x-y)\}$,
where
   x is the average reflectance spectrum of the object, y is the average reflectance spectrum in the bounding area $X_k$, and $\Sigma$ is the spectral covariance matrix of the object.

15. A computer program product comprising a computer usable medium having computer program logic stored thereon for causing a processor to track an object, the computer program logic comprising:
   logic configured to cause the processor to receive radiance spectra of the object;
   logic configured to cause the processor to convert the radiance spectra to reflectance spectra of the object;
   logic configured to cause the processor to construct a state description for the object comprising the reflectance spectra, a specification of a bounding area containing the object, and a location and velocity of the object in a current frame;

logic configured to cause the processor to predict the location of the object in a next frame, based on the constructed state description and a delta description that comprises indications of predicted changes in the location and velocity, and based on invariance of the reflectance spectra of the object; and logic configured to cause the processor to correct the location of the object for the next frame, wherein the reflectance spectra of the object is received from a hyperspectral video camera.

16. The computer program product of claim 15, wherein the radiance spectra comprises radiance hyperspectra and the reflectance spectra comprises reflectance hyperspectra.

17. The computer program product of claim 15, wherein the radiance spectra of the object is received from a hyperspectral video camera.

18. The computer program product of claim 15, wherein said logic configured to cause the processor to predict the location of the object in a next frame comprises:

logic configured to cause the processor to predict a next state description.

19. The computer program product of claim 18, wherein said logic configured to cause the processor to correct the location of the object in a next frame comprises:

logic configured to cause the processor to calculate a probability distribution for the next state description, wherein the probability distribution is dependent on reflectance spectra derived for the object in the next frame;

logic configured to cause the processor to find a probability that the predicted next state description is correct;

logic configured to cause the processor to use the predicted next state description to determine the location of the object in the next frame, if the probability exceeds a threshold value; and logic configured to cause the processor to otherwise use a next state description having the highest probability in the probability distribution to determine the location of the object in the next frame.

20. The computer program product of claim 19, wherein the probability that the predicted next state vector is correct is given by $p(X_k|Z_{1:k}) \propto \exp\{-(x-y)^T\Sigma^{-1}(x-y)\}$, where x is the average reflectance spectrum of the object, y is the average reflectance spectrum in the bounding area $X_k$, and $\Sigma$ is the spectral covariance matrix of the object.

* * * * *